Figure 1:
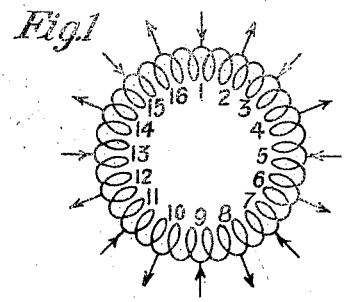

No. 842,966. PATENTED FEB. 5, 1907.
R. D. MERSHON.
METHOD OF OPERATING ELECTRIC MOTORS, GENERATORS, AND OTHER APPARATUS.
APPLICATION FILED FEB. 1, 1904.

3 SHEETS—SHEET 1.

Witnesses:

Ralph D. Mershon, Inventor
by Ken Page & Cooper, Atty's.

No. 842,966. PATENTED FEB. 5, 1907.
R. D. MERSHON.
METHOD OF OPERATING ELECTRIC MOTORS, GENERATORS, AND OTHER APPARATUS.
APPLICATION FILED FEB. 1, 1904.

3 SHEETS—SHEET 2.

Witnesses:
Raphaël Netter
A. S. Dunham.

Ralph D. Mershon, Inventor
by Kerr, Page & Cooper Att'ys.

No. 842,966. PATENTED FEB. 5, 1907.
R. D. MERSHON.
METHOD OF OPERATING ELECTRIC MOTORS, GENERATORS, AND OTHER APPARATUS.
APPLICATION FILED FEB. 1, 1904.

3 SHEETS—SHEET 3.

Witnesses:
Raphaël Netter
A. S. Dunham.

Ralph D. Mershon Inventor by Kerr, Page & Cooper Att'ys

UNITED STATES PATENT OFFICE.

RALPH D. MERSHON, OF NEW YORK, N. Y.

METHOD OF OPERATING ELECTRIC MOTORS, GENERATORS, AND OTHER APPARATUS.

No. 842,966.      Specification of Letters Patent.      Patented Feb. 5, 1907.

Application filed February 1, 1904. Serial No. 191,464.

*To all whom it may concern:*

Be it known that I, RALPH D. MERSHON, a citizen of the United States, residing at New York, in the county and State of New York, have invented a certain new and useful Method of Operating Electric Motors, Generators, and other Apparatus, of which the following is a specification, reference being had to the drawings accompanying and forming part of the same.

The invention which forms the subject of the present application for Letters Patent relates more particularly to the obtaining of any desired speed in motors and any desired frequency in generators, whether of the induction or synchronous type, though the invention is applicable as well to other apparatus in which magnetic poles are produced, as will appear more clearly from the detailed explanation given hereinafter; nor is the application of the invention limited to any particular type of apparatus, whether single phase or polyphase, or to any particular kind of windings, whether Gramme ring or drum, uniformly or non-uniformly distributed, &c.; but it applies to any winding which will lend itself to the production of the desired angle between poles. For the sake of convenience and brevity, however, the description of the invention will be confined to the case of its application to a single-phase induction machine with a uniform ring-winding.

It is usual in alternating-current apparatus to consider that the speed or the frequency depends upon the number of poles in the exciting or energizing element and that a closed or complete system of poles must be used, and heretofore, so far as I am aware, only an even number of poles—that is, two or a multiple of two—and a closed system of poles have been considered in this connection. Hence the obtaining of different speeds and frequencies by variation of the number of poles, either by change in the design of the apparatus or by changing the points of connection or otherwise changing the connections in any way when the construction of the apparatus permits such manipulation, is confined to closed systems of poles and to speeds or frequencies corresponding to pole numbers differing by at least two. This difference may sometimes be greater than is desirable. For example, a motor having four poles operated by currents having a frequency of three thousand six hundred alternations per minute will have a synchronous speed of nine hundred. If the number of poles be increased to six, the synchronous speed will then be six hundred, and if the number be reduced to two, the synchronous speed will be eighteen hundred. The difference in the two cases is three hundred and nine hundred, respectively, and it may often happen that these variations are too large for the purposes intended. It is therefore desirable to have some method by which practically any difference may be obtained, thereby securing a more convenient control of speed or frequency. It may also at times be desirable to reduce the number of leads to the apparatus even for speeds or frequencies corresponding to an even number of poles and which would therefore admit of a closed system of poles. This is especially the case with some forms of windings which are inherently such that the production of certain even pole numbers would greatly multiply the number of leads to the apparatus.

To provide a method which will accomplish these results is the object of my present invention.

The same consists in the novel method hereinafter described, and more particularly set forth in the claims.

It will be more easily understood when explained in connection with the accompanying drawings, in which—

Figure 2:
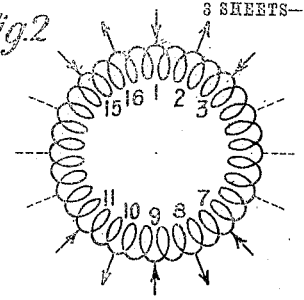
Figure 3:
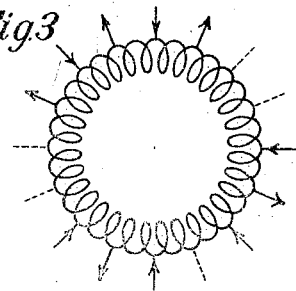
Figure 4:
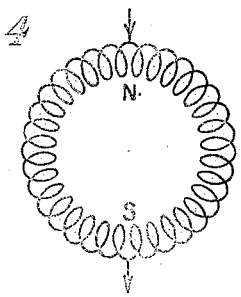
Figure 5:
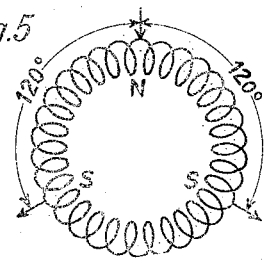
Figure 6:
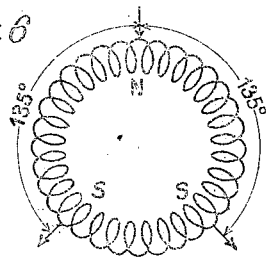
Figure 7:
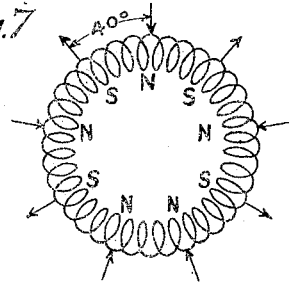
Figure 8:
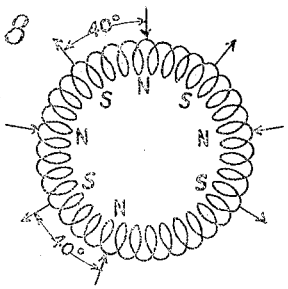
Figure 9:
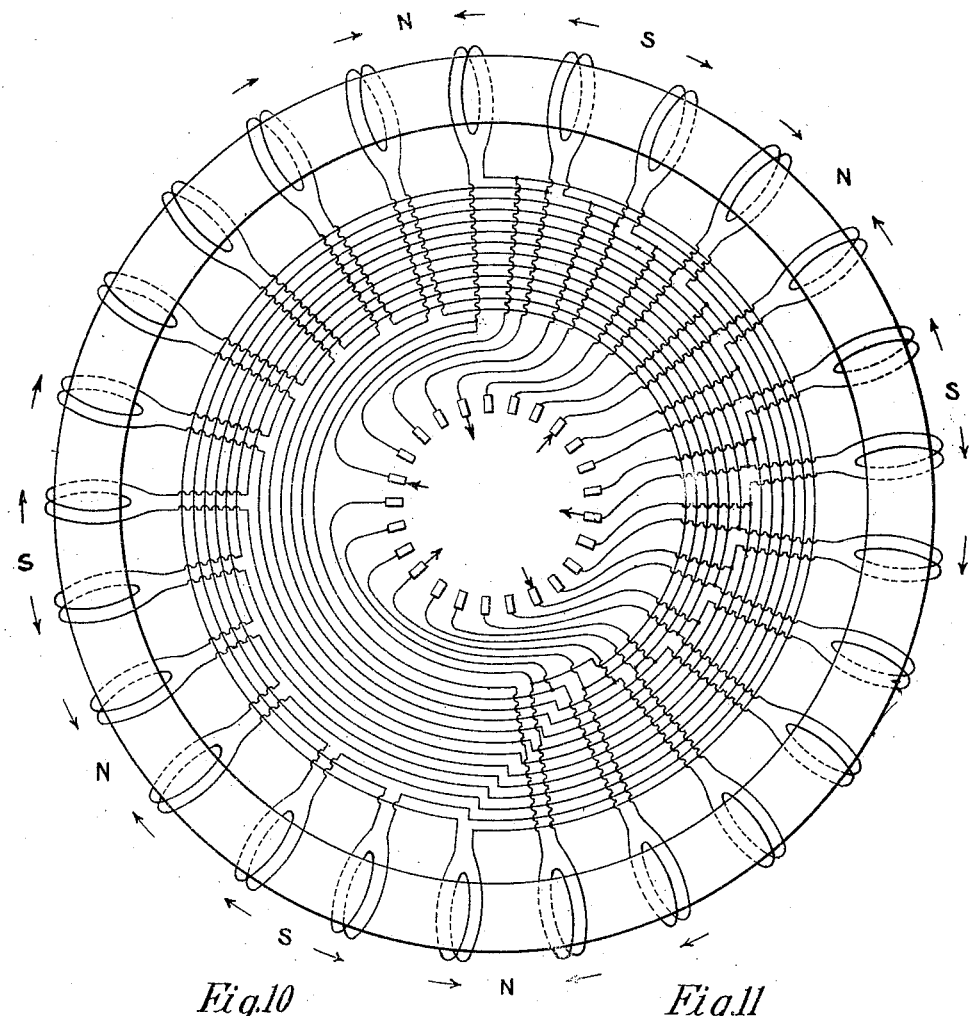
Figure 10:
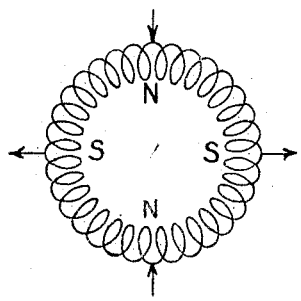
Figure 11:
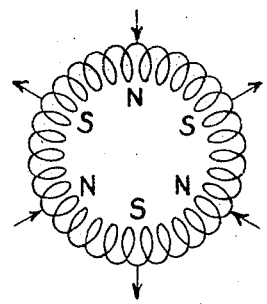
Figure 12:
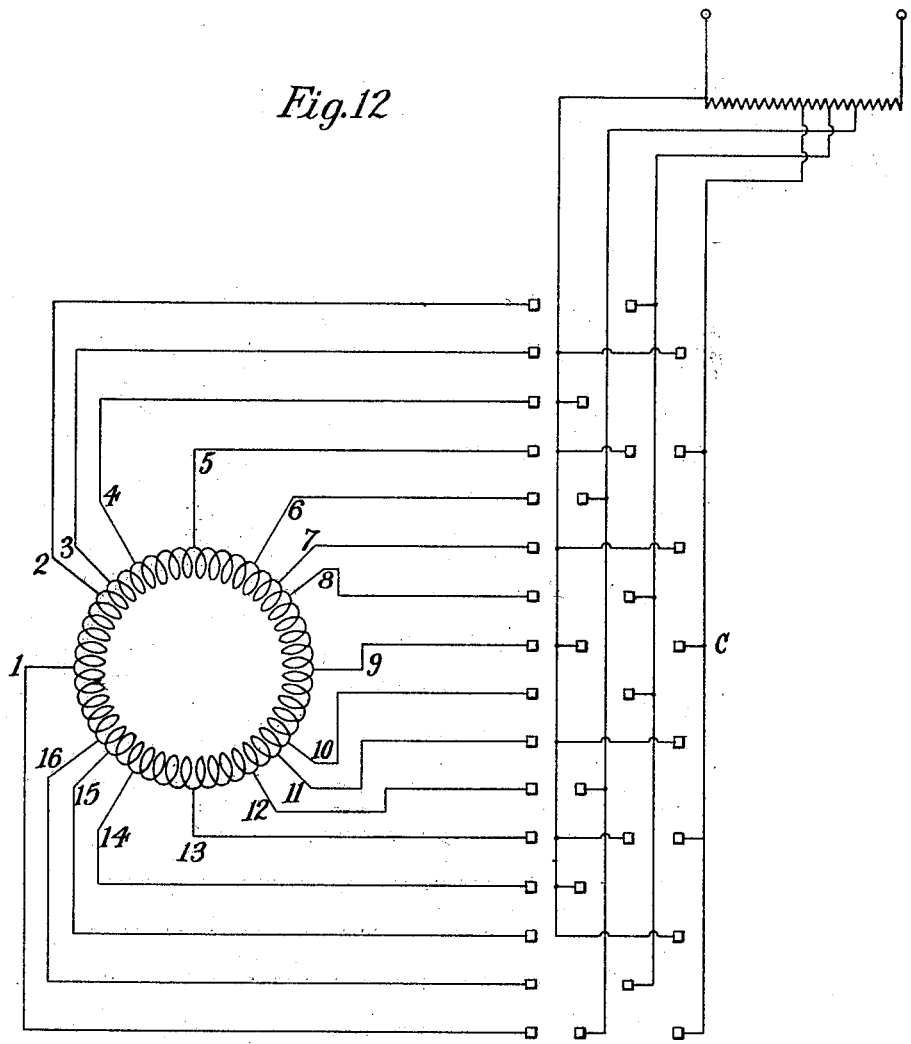

Figure 1 represents diagrammatically a uniformly-distributed gramme-ring winding and the connections for sixteen poles. Figs. 2 and 3 show the same element, but with some of the connections, and consequently the corresponding poles, omitted, the remaining connections and poles being as before. Fig. 4 shows a similar winding, with the equivalent of two poles, and Fig. 5 with the equivalent of three poles, so far as speed or frequency is concerned. Fig. 6 shows another arrangement for the equivalent of two and two-thirds poles, giving a corresponding speed or frequency. Fig. 7 shows an arrangement for the equivalent of nine poles, and Fig. 8 another arrangement for the same purpose. Fig. 9 is a diagram showing a ring-winding differing in the manner of the connections of its coils from that of the previous figures and giving an equivalent of twelve and one-half poles. Here the connections are for convenience of illustration shown brought out to a system of contacts in a manner somewhat similar to that in which the leads from a direct-current armature are brought out to the commutator-segments. The arrows applied to the contacts show the direction of the currents supplied to the winding and the points at which they enter the same. The arrows around the circumference of the ring show the directions of the magnetizing forces in the coils to which they correspond, due to the currents in the coils. If the ring shown be, say, the primary of an induction-motor, the secondary may be considered as outside of the ring, or if the secondary be considered as inside the ring the various leads inside the ring would be considered as removed to the outside or as displaced a sufficient distance from the plane of the figure. Figs. 10 and 11 show the relative positions of the poles in apparatus with four and six poles, respectively. Fig. 12 shows in diagram a single-phase system arranged for changing from six or eight poles to the equivalent of seven poles to obtain the intermediate speed corresponding thereto. In the latter case the poles are produced in groups.

It may here be noted that Figs. 1 and 4 show closed systems of poles, since the poles alternate in sign and are spaced equidistantly around the whole of the circumference, while in arrangements such as indicated in Figs. 2, 3, 5, 6, 7, 8, and 9, the poles do not necessarily alternate in sign throughout nor occupy the whole of the circumference, the result being an open system of poles in each case.

Referring now to Figs. 1 and 2, it will be seen that the latter is the same as the former, with the exception that six poles are omitted. Nevertheless, the angles between the remaining poles are the same, and therefore the synchronous speeds or frequencies are the same. This follows from the fact that a conductor moving with the same speed through the fields of poles 7 8 9 10 11 and 15 16 1 2 3 will be affected with the same frequency whether it be moving in Fig. 1 or in Fig. 2. Conversely, with the same frequency in each example the synchronous speed would be the same in both cases. It therefore follows, as previously stated, that the angle between the poles is the determining factor of synchronous speed or of frequency. If the principles be applied to the ordinary form of generators and motors of the "synchronous" type, whether the poles are salient or not, but in which, in general, the coils of the other element embrace angles approximately that of the pole-pitch, there will be a tendency for poles to be induced by the currents in the other element at the points where excitation is suppressed, and such induction will result unless the field structure be suppressed at these points; but whether the latter be suppressed or not and if the poles be induced the principle of my invention is in no way invalidated. In structures of the induction type, in which the circuits of the other element embrace angles in general considerably less than the polar pitch, this inductive effect will extend only slightly beyond the excited portion of the exciting element. If the circuits of the other element embrace angles approximately equal to the polar pitch, this inductive effect may, as in the previous case, extend beyond these poles; but, as previously stated, in such case the principle of my invention is in no way invalidated. Bearing in mind, then, that the speed or frequency depends upon the angular spacing of the poles the apparatus shown in Fig. 4 will have a synchronous speed or frequency corresponding to two poles; but in Fig. 5, where the leads are one hundred and twenty degrees apart, the synchronous speed or frequency corresponds to three poles. Similarly in Fig. 6, when the leads are spaced so as to bring poles of opposite sign $\frac{360}{2\frac{2}{3}} = 135°$ apart the synchronous speed or frequency corresponds to two and two-thirds poles. Fig. 7 shows connections for nine poles by spacing the poles forty degrees apart. It will be noticed that with an odd or non-integral number of poles two poles of the same sign fall adjacent to each other. When their proximity becomes such that they will in any way interfere, either in the exciting-winding or in the winding of the other element, as many poles, one or more, as necessary may be omitted at the place where the interference occurs. For example, Fig. 8 shows the nine-pole connection with one of the north poles of Fig. 7 omitted.

In some cases—as, for instance, in the case of two circuit multipolar drum or ring windings—it may be necessary or desirable to have the poles in groups, one or more poles being omitted between groups. An example of this is shown in Fig. 9. Here an odd number of coils is used, which of itself prevents the use of an integral number of poles, and therefore the use of a closed system of poles, since one of the conditions for a closed system of poles is that the number of poles shall be an even integer. There is another reason aside from that of the odd number of coils why Fig. 9 would not admit of a closed system of poles for certain pole numbers, although it might for others if it had an even number of coils divisible by the number of poles required An examination of Fig. 9 will show that coils approximately opposite will, if the proper terminals be chosen, be in series. This means that the relation between the poles to which these two coils contribute is fixed so long as the series connection of the coils is employed. For instance, by reference to the figure it will be seen that poles of the same sign are approximately opposite. If the number of coils were even, such poles might be exactly opposite. Now the condition of poles of the same sign at opposite ends of a diameter is one which answers for some numbers of poles, but not for others, as will be seen on comparing Figs. 10 and 11, representing apparatus similar to that already described, Fig. 10 showing a four-pole connection and Fig. 11 one for six poles. In the former poles of the same sign come opposite; but in the latter opposite poles are of contrary sign. It will be evident, therefore, that in a winding similar to that of Fig. 9, even if the number of coils be such as is evenly divisible by an even number of poles, (in which case, therefore, with a winding connected similarly to Fig. 9 poles of the same sign will come exactly opposite instead of approximately opposite, as in Fig. 9,) it will be impossible to obtain pole-numbers other than those in which poles of the same sign are opposite unless opposite coils be used in other than their series connection, which will necessitate a greater number of leads to the apparatus. In such a winding, therefore, in order to keep down the number of leads it might at times be desirable to use the opposite coils in their series connection, and in order to do so for pole-numbers other than those in which poles of the same sign come opposite it would be necessary to operate with the poles in two or more groups, as in Fig. 9, the groups being separated by an unexcited portion of the element. This explanation, which has been made with reference to a winding in which the coils connected in series are opposite or approximately opposite, holds for the series connection of coils bearing any other definite fixed relation—as, for instance, where the coils are arranged at intervals of ninety degrees.

In Fig. 12 is shown a system, which, for the sake of simplicity, in the diagram is shown as for single phase and with a uniformly-distributed ring-winding, adapted for change in the number of its poles by change in the points at which the current or currents are led into the winding. By tracing out the connections it will be seen that in the first position of the controller (diagrammatically indicated at C) current will be supplied to the motor by leads 1–4–6–9–12–14, each sixty degrees apart, and therefore producing six poles. In the next position leads 2–5–8 of one group are fifty-one and three-sevenths degrees apart, and leads 10–13–16 of another group are also fifty-one and three-sevenths degrees apart, thus giving a speed equivalent to seven poles. In the next position the current is fed through leads 1–3–5–7–9–11–13–15, which are forty-five degrees apart, giving eight poles. In the intermediate speed, corresponding to seven poles, by omitting one lead from the possible total of seven leads and arranging the two groups of three each with the middle lead of each group on a diameter the total number of leads is reduced, since by so arranging them not only has the one lead mentioned been omitted, but it has also been made possible to use leads 5 and 13, which are employed in the eight-pole connection. The same principles apply, of course, to polyphase apparatus and to windings other than the ring form, or those which are uniformly distributed.

The novel apparatus described herein I do not claim in this application, but do so broadly in my copending application, filed December 3, 1906, Serial No. 346,094.

What I claim is—

1. The method of obtaining a desired speed or frequency in apparatus in which magnetic poles are produced, which consists in producing the poles in separated groups in which angular distances between adjacent poles of opposite sign in the same group correspond to the speed or frequency desired, as set forth.

2. The method of obtaining a desired speed or frequency in apparatus in which magnetic poles are produced, equivalent to an odd or non-integral number of poles, which consists in producing the poles with angular distances, between adjacent poles of opposite sign, corresponding to the desired speed or frequency.

3. The method of obtaining a desired speed or frequency in apparatus in which magnetic poles are produced, equivalent to an odd or non-integral number of poles, which consists in producing the poles with angular distances, between adjacent poles of opposite sign, corresponding to the desired speed or frequency, and where a continuation of such production of poles around the circumference of the excited element causes overlapping or interference of poles, dropping out one or more poles at such point.

4. The method of obtaining a desired speed or frequency in apparatus in which magnetic poles are produced, equivalent to an odd or non-integral number of poles, which consists in producing the poles in groups with angular distances, between adjacent poles of opposite sign in the same group, corresponding to the desired speed or frequency.

5. The method of obtaining a desired speed or frequency in apparatus in which magnetic poles are produced, equivalent to an odd or non-integral number of poles, which consists in producing the poles in separated groups, with angular distances between adjacent poles of opposite sign in the same group, corresponding to the desired speed or frequency.

6. In electrical apparatus in which magnetic poles are produced, and which is adapted for change of the number of poles therein, the method of varying the speed or the frequency which consists in changing the number of poles and producing the same in separated groups in which angular distances, between adjacent poles of opposite sign, correspond to the speed or frequency desired, as set forth.

7. In electrical apparatus in which magnetic poles are produced, and which is adapted for change of the number of poles therein, the method of varying the speed or frequency and obtaining a speed or frequency equivalent to an odd or non-integral number of poles, which consists in producing the poles with angular distances, between adjacent poles of opposite sign, corresponding to the desired speed or frequency, as set forth.

8. In electrical apparatus in which magnetic poles are produced, and which is adapted for change of the number of poles therein, the method of varying the speed or frequency and obtaining a speed or frequency equivalent to an odd or non-integral number of poles, which consists in producing the poles with angular distances, between adjacent poles of opposite sign, corresponding to the desired speed or frequency, and where a continuation of such production of poles around the circumference of the excited element causes overlapping or interference of poles, dropping out one or more poles at such point, as set forth.

9. In electrical apparatus in which magnetic poles are produced, and which is adapted for change of the number of poles therein, the method of varying the speed or frequency and obtaining a speed or frequency equivalent to an odd or non-integral number of poles, which consists in producing the poles in groups with angular distances, between adjacent poles of opposite sign in the same group, corresponding to the desired speed or frequency, as set forth.

10. In electrical apparatus in which magnetic poles are produced, and which is adapted for change of the number of poles therein, the method of varying the speed or frequency and obtaining that equivalent to an odd or non-integral number of poles, which consists in producing the poles in separated groups with angular distances, between adjacent poles of opposite sign in the same group, corresponding to the desired speed or frequency, as set forth.

11. In electrical apparatus in which magnetic poles are produced, the method of obtaining a speed or frequency equivalent to an odd or non-integral number of poles, which consists in feeding the current or currents into the winding at such points as will produce poles with angular distances, between adjacent poles of opposite sign, corresponding to the desired speed or frequency, as set forth.

12. In electrical apparatus in which magnetic poles are produced, the method of obtaining a speed or frequency equivalent to an odd or non-integral number of poles, which consists in feeding the current or currents into the winding at such points as will produce poles with angular distances, between adjacent poles of opposite sign, corresponding to the desired speed or frequency, and where such production of poles around the circumference of the excited element will cause overlapping or interference of poles, dropping out one or more poles at such point, as set forth.

13. In electrical apparatus in which magnetic poles are produced, the method of obtaining a desired speed or frequency which consists in feeding the current or currents into the winding at such points as will produce the poles in groups with angular distances, between adjacent poles of opposite sign in the same group, corresponding to the desired speed or frequency, as set forth.

14. In electrical apparatus in which magnetic poles are produced, the method of obtaining a speed or frequency equivalent to an odd or non-integral number of poles, which consists in feeding the current or currents into the winding at such points as will produce the poles in separated groups with angular distances, between adjacent poles of opposite sign in the same group, corresponding to the desired speed or frequency, as set forth.

15. In an alternating-current motor, the method of obtaining a desired speed, equivalent to an odd or non-integral number of poles, which consists in feeding the current or currents into the winding at such points as will produce poles with angular distances, between adjacent poles of opposite sign, corresponding to the speed or frequency desired, as set forth.

16. In an alternating-current motor, the method of obtaining a desired speed, equivalent to an odd or non-integral number of poles, which consists in feeding the current or currents into the winding at such points as will produce poles with angular distances, between adjacent poles of opposite sign, corresponding to the desired speed or frequency, and where such production of poles around the circumference of the excited element will cause overlapping or interference of poles, dropping out one or more poles at such point, as set forth.

17. In an alternating-current motor, the method of obtaining a desired speed, which consists in feeding the current or currents into the winding at such points as will produce the poles in groups with angular distances, between adjacent poles of opposite sign in the same group, corresponding to the desired speed, as set forth.

18. In an alternating-current motor, the method of obtaining a speed equivalent to an odd or non-integral number of poles, which consists in feeding the current or currents into the winding at such points as will produce the poles in separated groups with angular distances, between adjacent poles of opposite sign in the same group, corresponding to the speed desired, as set forth.

19. In an alternating-current motor adapted for change of the number of poles therein, the method of varying the speed from that corresponding to a given angle between poles to a speed equivalent to an odd or non-integral number of poles, which consists in changing the angle between adjacent poles of opposite sign to that corresponding to the desired speed, as set forth.

20. In an electrical apparatus in which magnetic poles are produced, the method of obtaining a desired speed or frequency intermediate to that for one even number of poles and that for the next even number, which consists in producing poles at such intervals that the angular distance between the same bears the same ratio to the angular distance in the first number of poles, as the desired speed or frequency bears to that of the first number of poles, as set forth.

RALPH D. MERSHON.

Witnesses:
M. LAWSON DYER,
S. S. DUNHAM.